United States Patent
Coster et al.

(10) Patent No.: US 7,496,182 B2
(45) Date of Patent: Feb. 24, 2009

(54) HANDLING EMERGENCY SERVICE CALLS ORIGINATING FROM INTERNET TELEPHONY

(75) Inventors: Mark W. Coster, Vienna, VA (US); John R. Anderson, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 686 days.

(21) Appl. No.: 11/106,603

(22) Filed: Apr. 15, 2005

(65) Prior Publication Data
US 2006/0233317 A1 Oct. 19, 2006

(51) Int. Cl.
*H04M 11/00* (2006.01)
(52) U.S. Cl. .......................... 379/45; 370/352; 455/403
(58) Field of Classification Search .......... 370/352; 379/45; 455/403
See application file for complete search history.

(56) References Cited

U.S. PATENT DOCUMENTS 6,963,557 B2 * 11/2005 Knox .................... 370/352
2002/0196918 A1 * 12/2002 Culli et al. ............. 379/121.01
2003/0211839 A1 * 11/2003 Baum et al. ............... 455/403
2006/0039539 A1 * 2/2006 Goldman et al. ............. 379/45
2006/0120517 A1 * 6/2006 Moon et al. .................. 379/45

OTHER PUBLICATIONS

"Packet-Based Multimedia Communications Systems", International Telecommunication Union, ITU-T Recommendation H.323, Jul. 2003.
"Part 11: Wireless LAN Medium Access Control (MAC) and Physical Layer (PHY) Specifications", IEEE Computer Society, 1999.

* cited by examiner

*Primary Examiner*—Curtis Kuntz
*Assistant Examiner*—Maria El-Zoobi

(57) ABSTRACT

A method and system for interfacing internet protocol-enabled emergency calls to a public 9-1-1 system are described. The method can include routing an emergency call originating from internet protocol telephony to a data network via a routing device which may include an identifier. The method can include transferring the routed emergency call to a predetermined public service answering point based on the identifier.

21 Claims, 3 Drawing Sheets

HANDLING EMERGENCY SERVICE CALLS ORIGINATING FROM INTERNET TELEPHONY

FIELD OF THE INVENTION

Implementations relate generally to data based forms of telecommunications technology and, more particularly, to interfacing Internet protocol (IP)-enabled telephony emergency service calls to 9-1-1 emergency communications systems.

BACKGROUND OF THE INVENTION

Emergency 9-1-1 service has been designated in the U.S. as the emergency system for public use for emergency reporting to and/or requesting emergency assistance from public safety entities, typically for dispatch of emergency service providers (ESPs) (e.g., law enforcement, firefighters, emergency medical service (EMS)) to the scene of the emergency. An integral functional feature of existing 9-1-1 networks is that a call placed to 9-1-1 from anywhere within a calling region can be quickly directed to the appropriate ESP that can get to the site of the emergency the quickest, if necessary, in lieu of the need to directly dial the ten digit telephone number of the ESP. Current 9-1-1 emergency service capabilities range from traditional or basic 9-1-1 emergency service to enhanced or E911 emergency service.

Current 9-1-1 service has specific processing features that are designed to improve its functionality (e.g., ease of use, uniformity, etc.), and to reflect that time is of the essence in handling an emergency call. An enabling process for such features is the capability to determine, from call signal information (i.e., automatically), the geographic location of the calling party. The geographic source of the call has to be sufficiently precise so that the call can be immediately routed from anywhere within the calling region in which it is placed, to a predetermined public safety answering point (PSAP) in a given jurisdiction (e.g., municipality, county, etc.), where it is first "answered" by an operator or "call taker." The call is then transferred or communicated from the PSAP to a predetermined ESP(s) for disposition based upon, for example, proximity to the site of the emergency.

Current processing features of the 9-1-1 infrastructure have developed around the use of traditional wireline technology that uses circuit-switched telephony (e.g., public switched telephone networks (PSTNs)), which is characterized by nominal subscribers using landlines at fixed geographic locations. Such features have evolved to provide access to the existing 9-1-1 networks for 9-1-1 calls originating from wireless telecommunications technology. For wireline placed 9-1-1 calls, the geographic location of the caller for purposes of PSAP routing can be determined automatically from the exchange portion of the calling party's telephone number (i.e., the first three digits), or from the calling party's entire telephone number (i.e., from caller identification ("ID")). For cellular placed 9-1-1 calls, the geographic location of the caller for purposes of PSAP routing can be determined automatically from location information regarding the operative cell tower, or from global positioning system (GPS) data.

Internet telephony, such as voice over IP (VoIP) phone service, is reportedly poised to become the predominant technology used in the telecommunications industry. Thus, emergency calls will increasingly be placed from VoIP devices. Current VoIP offerings, however, fail to adequately provide suitable 9-1-1 network service, in part, due to the technological challenges in automatically determining the source of the 9-1-1 call, i.e., the specific geographical location of the VoIP device.

A VoIP placed call can originate from a VoIP user device and enter the Internet as a signal that is geographically non-descriptive. The call can be routed through the Internet to a PSTN that is geographically remote from the VoIP user device. Additionally, because VoIP user devices can be readily relocated and used at any available suitable network connection, the VoIP subscriber's fixed physical address that can be associated with the subscriber's phone number is not always going to be the originating location of the call. Thus, the "nomadic" use of VoIP telephony can operate to obscure the source of the VoIP placed call.

Proposed methods to provide 9-1-1 network access to VoIP users include diverting the VoIP-placed 9-1-1 call to the PSTN based on the VoIP subscriber's fixed address location. However, such processing can only be accomplished when the VoIP device is used at the subscriber's address location, and the VoIP subscriber has successfully registered the correct address information with the VoIP service provider, etc. Otherwise, the 9-1-1 call is simply dropped, or the 9-1-1 service disabled when used at an alternative or remote location. Thus, proposed methods to interface IP-enabled telecommunications to conventional 9-1-1 service are largely unavailable to VoIP device users. Accordingly, local service access VoIP systems do not process 9-1-1 calls in the manner that landline and cellular phones do, and thus such calls are not handled with the exceptional level of care and priority afforded to wired and cellular telephone calls to 9-1-1.

The effectiveness of the 9-1-1 emergency reporting system relates to public expectations regarding its convenience and uniformity. Thus, it is desirable to standardize 9-1-1 call processing, from the perspective of the caller, regardless of the telecommunications technology used to place the call to 9-1-1. Moreover, it is likely that government regulations and/or industry-adopted standards will soon require VoIP-enabled calls to 9-1-1 to have the "look and feel" of conventional 9-1-1 calls.

SUMMARY OF THE INVENTION

According to one aspect, a method for interfacing internet protocol-enabled emergency calls to a public 9-1-1 system includes routing an emergency call originating from internet protocol telephony to a data network via a routing device having a routing device identifier; and transmitting the routed emergency call to a public service answering point (PSAP), based on the routing device identifier.

According to another aspect, a network device includes a routing device to receive incoming data including an emergency call from an IP telephony user device via a first data network; and route the received data including the emergency call along with routing device location information to a second data network.

According to a further aspect, a method for providing 9-1-1 services to an internet telephony user includes: receiving a dialed 9-1-1 call on a data network from an IP user device configured to be selectively used from a fixed location connection and from a plurality of remote connections, wherein the 9-1-1 call includes profile information; determining from the profile information that the dialed 9-1-1 call originated from one of the remote connections; identifying an end-user routing device used to route the dialed 9-1-1 call; designating an assigned PSAP based on the identified end-user routing device; redirecting the routed 9-1-1 call to a public switched telephone network (PSTN); and forwarding the redirected 9-1-1 call to the assigned PSAP.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Overview

Systems and methods consistent with the principles of the invention can facilitate 9-1-1 services adoption and implementation for emergency calls from users of internet protocol (IP) telephony. According to one implementation, location information regarding a routing device through which an IP-enabled emergency call is routed can be used to identify the appropriate public service answering point (PSAP) for receiving the emergency call, which can then be forwarded to an emergency service provider (ESP) in the vicinity of the caller.

"Emergency call," as the term is used herein, is to be broadly interpreted to include any suitable transmission of a signal message to an emergency number. Emergency calls can include, for example, analog, digital, and wireless transmissions that are subject to any known signal processing. An emergency call can include voice, text, image, video, page signaling, etc., in any format. An emergency call can originate from any known method for initiating a call such as manual dialing, voice command, activating a dedicated switch, etc. "Emergency number," as the term is used herein, is to be broadly interpreted to include, for example, the numeric string, 9-1-1. However, systems consistent with principles of the invention can operate to any suitable universalized dialing sequence or code associated with any known or existing "9-1-1 service," as well as any contemplated IP based "9-1-1 network," which terms are to be broadly interpreted to include any location-sensitive emergency response service.

Exemplary System

Figure 1:
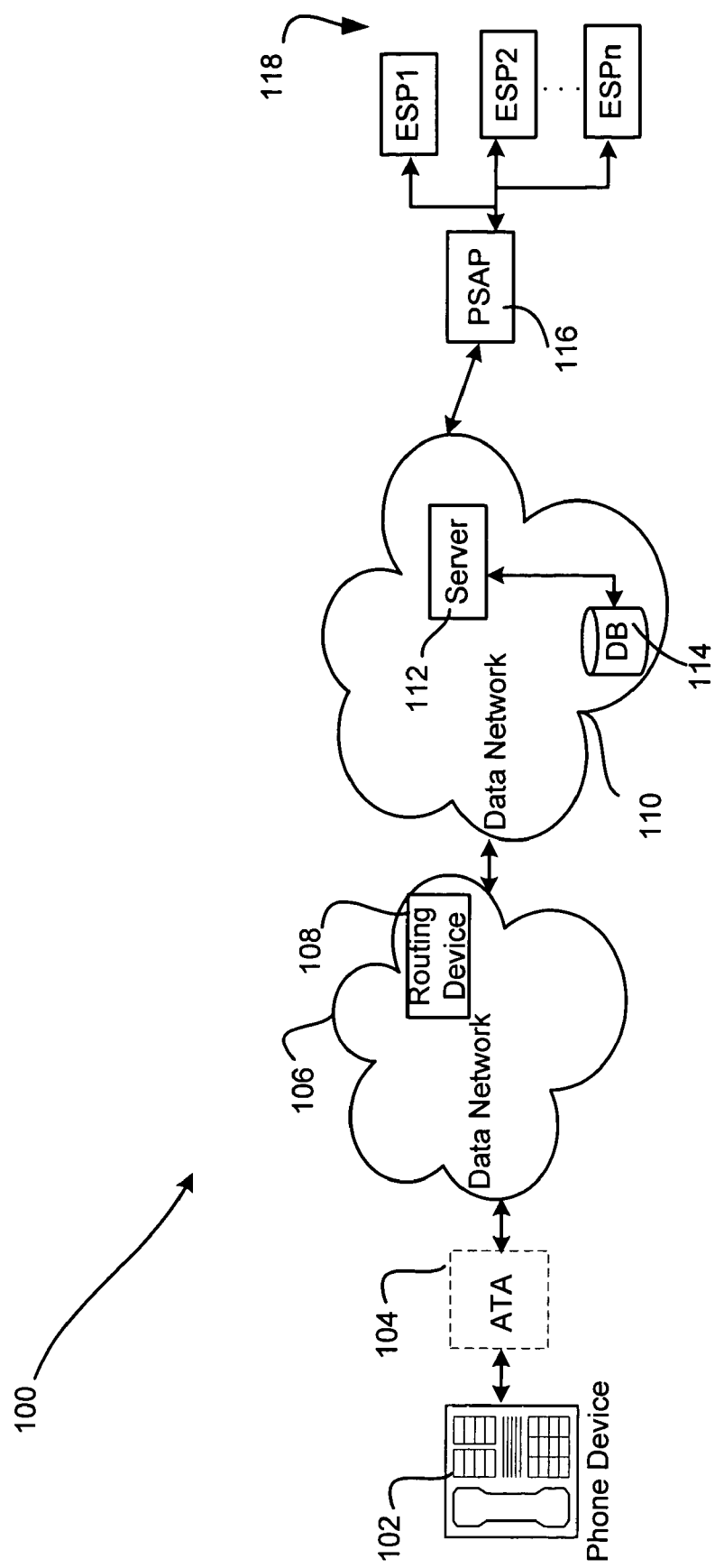
FIG. 1 is an exemplary schematic diagram illustrating an exemplary system in which methods and systems consistent with the principles of the invention can be implemented.

FIG. 1 is an exemplary illustration of a system 100 in which methods and systems consistent with the principles of the invention can be implemented. As shown, system 100 may include a phone device 102 that operatively connects to a data network 106 through an analog telephone adapter (ATA) 104, and a routing device 108 that may be associated with data network 106. System 100 may also include a data network 110 that operatively connects to data network 106, a server 112 that may be associated with data network 110, and a database 114 that may be accessible to the server 112. System 100 may include a public service answering point (PSAP) 116 that operatively connects to data network 110 and multiple emergency service providers (ESPs) 118.

Phone device 102 can be any suitable user device for enabling voice communication via a data network, e.g., a voice over IP (VoIP) device, voice over Internet (VOI) phone, etc. In one implementation consistent with principles of the invention, phone device 102 can include a conventional analog telephone connected to data network 106 via a digital gateway, for example, ATA 104, or any device capable of initiating, transmitting, and receiving voice and data communications to a data network, such as VoIP gateways. It should be understood that the single instance of phone device 102 shown in FIG. 1, is provided for simplicity. In practice, methods and systems consistent with the principles of the invention can include any number and type of phone devices.

In one implementation consistent with principles of the invention, phone device 102 can include self-contained or stand alone broadband phones or software-based VoIP telephony interfaces (e.g., for running on laptops, personal digital assistants (PDAs), or personal computers) for which ATA 104 need not be used. For example, phone device 102 can include a hardwired VoIP telephone having an Ethernet port or a built-in modem, a session initiated protocol (SIP) telephone device, an H.323 telephone device, and a wireless VoIP phone having a built-in wireless fidelity (WiFi) transceiver or a built-in WiFi and global system f or mobile communications (GSM) transceiver (e.g., 802.11(x)-based).

Data networks 106 and 110 can include a computer network of any type suitable for receiving, storing, processing, and/or transmitting data (e.g., discrete packets or units) among nodes or network elements in communication, having any suitable topology (e.g., bus, star, ring, etc.), protocol (e.g., IP, Ethernet, token-ring network, etc.), and architecture (e.g., peer-to-peer, client/server, etc.). For example, data networks 106 and 110 can include a local area network (LAN), a wide area network (WAN), a metropolitan area network (MAN), a campus-area network (CAN), a government area network (GAN), a home-area network (HAN), an intranet, the Internet, an Internet service provider's network, a VoIP service provider's network, and/or a combination of networks.

Routing device 108 associated with data network 106 can include any network element or device suitable for routing or forwarding data packets along. For example, routing device 108 can include a router, a modem of any type, a switching device, an interface device, a gateway, customer premises equipment (CPE) network devices, VoIP service provider devices, and/or incumbent local exchange carrier (ILEC) devices (e.g., network routers located at a central office). Consistent with principles of the invention, routing device 108 can include, for example, an edge router, a first hop router, a broadband interface, a VoIP gateway, a CPE routing device, and/or an end-user routing device. In one implementation consistent with the principles of the invention, routing device 108 can include a memory or a storage medium of any type, for example, flash random access memory (RAM). In another implementation consistent with the principles of the invention, routing device 108 can include a processing unit or processor of any type, for example, for receiving and responding to queries from server 112.

Server 112 associated with data network 110 can include any suitable network device for managing resources on data network 110. For example, server 112 can include a network server having any combination of hardware and software (e.g., a SIP proxy server and/or SIP redirect server) suitable for receiving a VoIP call from phone device 102, examining the call request, and routing the call to an appropriate destination. Details regarding the specific functionality of server 112 are set forth in additional detail below.

Database 114 associated with server 112 can include a suitable network element for maintaining information organized, for example, in fields, records, and/or files. Database 114 can include maintained profile information for each routing device 108 associated with server 112. Consistent with principles of the invention, the profile information can include a routing device identifier, routing device identification information, address location information, routing device location information, an IP address, a media access control (MAC) address, and/or corresponding PSAP information associated with the routing device 108. The routing device identifier and routing device identification information can include any unique designation assigned to routing device 108 under any suitable identification scheme. Address and routing device location information can include specific physical location information for routing device 108, including geographic location or position information in any suitable format for routing device 108. PSAP information can include contact or routing information for designated or assigned primary, secondary, or alternative PSAP corresponding to routing device 108.

Consistent with principles of the invention, PSAP 116 can include any suitable system or process for receiving emergency calls, e.g., 9-1-1 calls, for handling or dispositioning. For example, PSAP 116 can be a public entity having personnel (e.g., operators or call takers) and/or equipment for initially answering or fielding incoming 9-1-1 calls. For example, PSAP 116 can include conventional facilities capable of receiving conventional 9-1-1 calls from circuit-switched telephony, as well as IP based or systems capable of supporting emergency voice, text, and/or image messaging from the Internet. PSAP 116 can be located in the vicinity of the source of the emergency call, and in the vicinity of ESPs 118, to which the call can be forwarded. Although only one PSAP 116 is shown, depending on the area of service or jurisdiction (typically a municipality or county), system 100 can include additional PSAPs.

Consistent with principles of the invention, ESPs 118 can include any suitable emergency response entity or agency, which can be dispatched in the vicinity of the 9-1-1 caller, i.e., the emergency scene or the site of the emergency. For example, ESPs 118 can include authorities such as law enforcement, firefighting, and/or EMS personnel in the locale, who can be dispatched to the emergency scene, if necessary.

Figure 2:
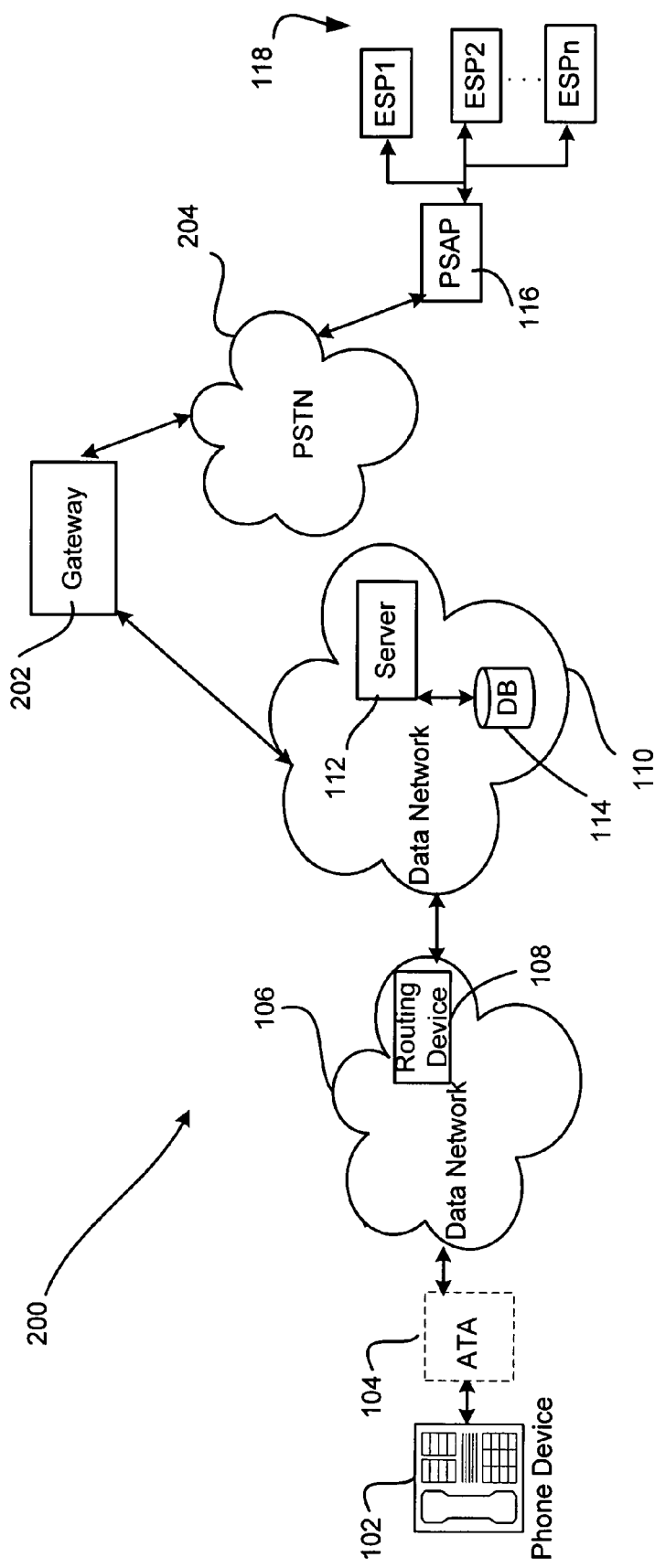
FIG. 2 is an exemplary schematic diagram illustrating an exemplary system in which methods and systems consistent with the principles of the invention can be implemented.

FIG. 2 illustrates another exemplary system 200 in which methods and systems consistent with the principles of the invention can be implemented. As shown, system 200 can include user phone device 102; data network 106; ATA 104; routing device 108; data network 110; server 112; database 114; PSAP 116; and ESPs 118, substantially as described above. Additionally, system 200 can include a gateway 202 operatively connected to data network 110 and a public switched telephone network (PSTN) 204 to which PSAP 116 connects.

Consistent with principles of the invention, gateway 202 can include any suitable node or network device for transmitting data from network to network. For example, gateway 202 can include any interface and combination of hardware and/or software capable of translating IP-based call information onto a public circuit-switched network, e.g., PSTN 204.

Consistent with principles of the invention, PSTN 204 can include any suitable telephone system, for example, using traditional telecommunications technology. For example, PSTN 204 can be any circuit-switched telephony network, such as a public-circuit-switched network.

Exemplary Processing

Figure 3:
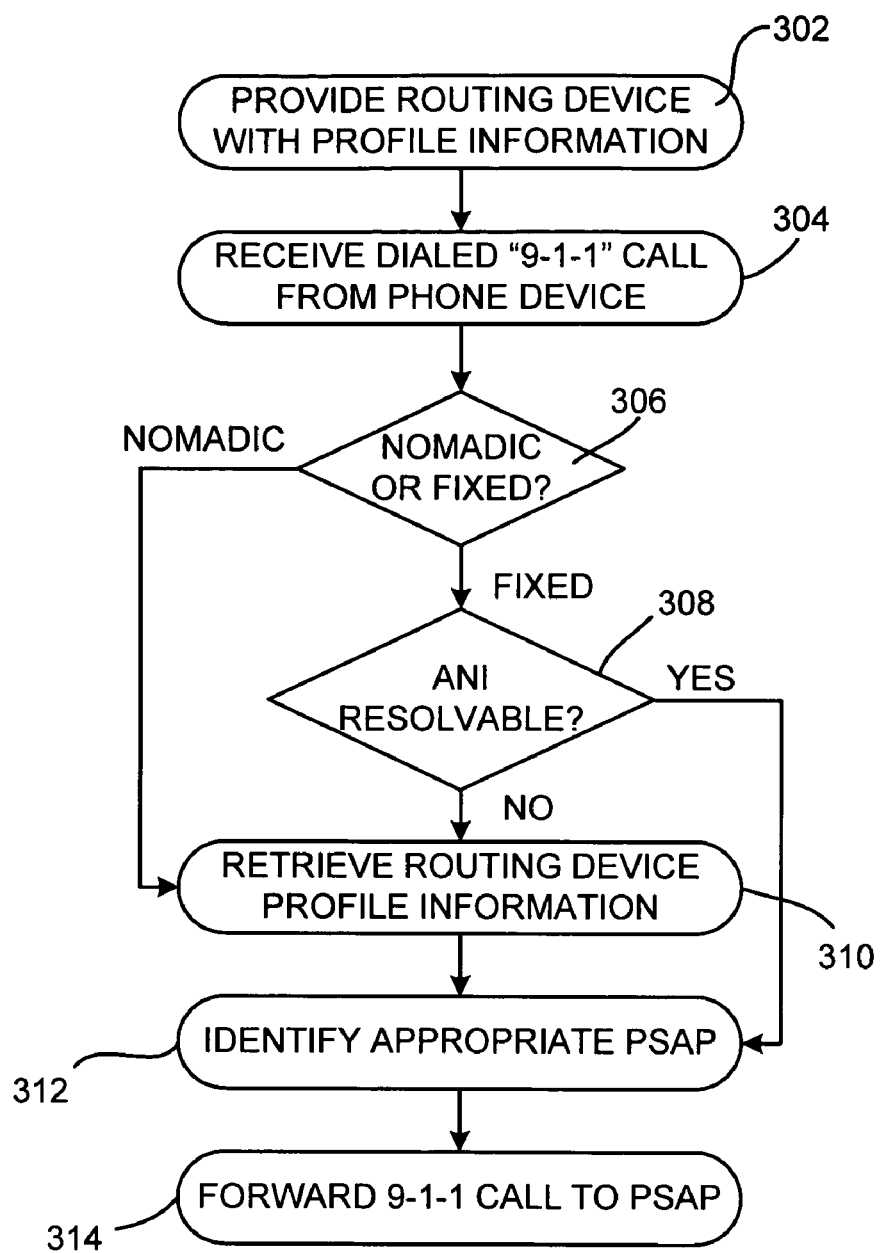
FIG. 3 is an exemplary flow diagram illustrating a method for connecting internet telephony user devices to 9-1-1 services consistent with the principles of the invention.

FIG. 3 is a flowchart of exemplary processing for supporting IP-enabled telephony emergency service calls to 9-1-1 emergency communications systems according to an implementation consistent with principles of the invention. Initially, a routing device 108 may be provided with routing device profile information (operation 302) that may be specific to routing device 108. The profile information may include an identifier, geographic location information that identifies the physical location of routing device 108, and the like. For example, a user of routing device 108 (e.g., a modem, other CPE, ILEC equipment, an edge router, a first hop router, etc.) and/or a network administrator may provide a profile information upon installation or performing other configuring operations. In one exemplary implementation, profile information can be stored in routing device 108. A storage medium in routing device 108 can register profile information for routing device 108 as entered, for example, in response to a prompt as part of setup or arranging of routing device 108. The profile information can be provided to server 112, for example, and stored in database 114, when entered in routing device 108 and/or when an emergency call is routed through routing device 108.

According to another exemplary implementation, providing routing device 108 with a routing device identifier may include collecting and storing (e.g., in database 114) at least a specific physical address associated with the routing device identifier. The database can include PSAP information corresponding to a particular routing device identifier, for example, that designates specific primary, secondary, and/or alternative PSAPs to the routing device identifier.

Following profile establishment, a 9-1-1 call dialed or originating from phone device 102 (and transmitted through ATA 104, if necessary) is received as a signal transmission or packet data on data network 106. The call signal can be transmitted to and routed through routing device 108 associated with data network 106 to data network 110. The stored profile information can be attached to or provided in an appropriate field or header of the call signal, thereby associating routing device 108 with the emergency call.

The call signal received via data network 110 can be transmitted to and processed by server 112 associated with data network 110, and identified as a 9-1-1 call (operation 304). As described above, server 112 can include VoIP proxy and redirect servers suitable for processing and routing received calls over the Internet. In one implementation, server 112 can include both a SIP proxy server and a SIP redirect server capable of receiving an IP call from phone device 102, managing the setup, processing, and tear down of the call, examining call data, determining appropriate treatment for the call, and routing the call to an appropriate destination.

Consistent with principles of the invention, one or more routing devices (not shown) may be in the transmission path in systems 100 and 200, on either or both sides of routing device 108. Such additional routing device(s) may or may not have an associated routing identifier or profile information. Server 112 can discriminately determine which of such routing devices to use in identifying the appropriate PSAP 116, for example, from information in the header of the call transmission. Under a hierarchal identification scheme, for example, a routing identifier associated with routing device 108 at a nearest point of call origination can be determined from header information in a designated field(s) (e.g., remark or text identifier) that is propagated or retained in the call transmission along the transmission path to server 112. The hierarchal identification scheme can be implemented, for example, by server 112 and/or a network administrator (not shown).

According to one exemplary implementation, server 112 can determine whether the 9-1-1 call originated from a fixed location associated with phone device 102 (e.g., the subscriber's home address), or from a location other than the fixed location (i.e., a remote location) based on the profile information (operation 306). If it is determined that phone device 102 is a nomadic device, the method can proceed to operation 310 set forth in detail below. However, if it is determined that phone device 102 is a fixed location device, it can be determined whether automatic number identification (ANI) and/or automatic location information (ALI) can be resolved from the subscriber's telephone number associated with phone device 102 (operation 308).

If phone device 102 is a nomadic device, and if ANI and/or ALI for phone device 102 are otherwise not resolvable, server 112 can determine or acquire an identity of routing device 108, such as a customer premise routing device, through which the 9-1-1 call was routed (operation 310). The profile information can be identified by server 112 and matched to or cross referenced against profile information maintained in database 114. According to one exemplary implementation, if server 112 cannot identify or retrieve profile information associated with the received call signal and/or stored in database 114, server 112 can transmit a query to routing device 108. Routing device 108 can provide profile information in response to the query from server 112. Server 112 can then use the received profile information to identify routing device 108.

Based on the identification of routing device 108, server 112 can access associated database 114 for PSAP 116 information (e.g., routing, contact information, and the like) for the identified routing device 108 (operation 312). The PSAP information including the appropriate PSAP 116 can be predetermined based on the geographic location of the identified routing device 108 as compared or pre-validated against, for example, a master street address guide (MSAG). The MSAG can include a listing of all streets and house number ranges within a specific 9-1-1 service area. The streets and address ranges are assigned selective routing codes, or emergency service numbers (ESNs), to enable proper routing of 9-1-1 calls. Accordingly, the MSAG is a summary database of valid address ranges, with the corresponding ESN for each range. Each assigned ESN is a unique number assigned to combinations of PSAP and ESPs.

Database 114 can include emergency service numbers ESNs for ESPs 118 associated with the designated PSAP 116, which can then be provided together with the emergency call upon selective forwarding of the IP-enabled 9-1-1 call to PSAP 116 (operation 314). The geographic location information for routing device 108 and/or ESN information can be provided to and/or displayed for a 9-1-1 PSAP 116 calltaker. Once terminated at PSAP 116, interactive querying of the caller by the calltaker can be performed to identify a specific geographic location of the emergency scene and a type of emergency. Concurrently, an appropriate ESP(s) 118 associated with the location of the identified routing device 108 in a vicinity of the emergency scene can be identified and contacted for dispatch, if necessary.

In one implementation consistent with principles of the invention, as shown in FIG. 2, following geographic location and corresponding PSAP/ESP identification, a call to the identified PSAP 116 can first be redirected to PSTN 204 through existing 9-1-1 call flow methods and procedures, for example, using an IP/PSTN gateway (e.g., gateway 202). In one implementation, the call can be initiated via a dedicated 9-1-1 trunk line associated with PSAP 116 by dialing a discrete ten digit number associated with PSAP 116. Upon receipt of such a call, the call can be selectively routed on the appropriate trunk line to PSAP 116.

In yet another implementation consistent with principles of the invention, systems 100 and 200 can detect or recognize a newly installed network device (e.g., a broadband interface (not shown)) along the transmission path, for example, using a suitable algorithm. Upon detecting the network device, server 112 may generate and transmit a query to phone device 102 (e.g., using a voice response unit (VRU), interactive voice response (IVR) system, etc.) regarding the physical location of the network device. The query may provide the location of routing device 108, and request or prompt a response from the installer of the network device and/or a user of phone device 102 concerning the location of the network device relative to routing device 108, whether the location will be fixed, etc. As a synchronization or updating process or "handshake" function, a routing device identifier or profile information may be established for the network device, and stored in database 114, based on the response received by server 112. The handshake or validation function or operation may be implemented, for example, by server 112 and/or a network administrator.

Conclusion

Implementations consistent with the principles of the invention enable provision of 9-1-1 service functionality to all manner of Internet telephony users.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

Moreover, while series of operations have been described with regard to FIG. 3, the order of the operations can be varied in other implementations consistent with the principles of the invention. Moreover, non-dependent operations can be implemented in parallel.

It will also be apparent to one of ordinary skill in the art that aspects of the invention, as described above, can be implemented in many different forms of software, firmware, and hardware. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for interfacing internet protocol (IP)-enabled emergency calls to a public 9-1-1 system comprising:
   receiving an emergency call originating from internet protocol (IP) telephony to a data network via a routing device having a routing device identifier;
   determining whether the emergency call originated from a first location associated with the IP telephony;
   determining, when the emergency call originated from the first location, whether at least one of an automatic number identification (ANI) or automatic location information (ALI) is resolvable for the IP telephony;
   matching the routing device identifier, when the emergency call did not originate from the first location or neither the ANI nor the ALI is resolvable, to stored profile information associated with the routing device; and
   transmitting the emergency call to a public service answering point (PSAP) based on the matched profile information or the at least one of the ANI or the ALI.

2. The method of claim 1, wherein the routing device identifier comprises a physical location of the routing device.

3. The method of claim 1, further comprising:
   transferring the received emergency call to a predetermined public switched telephone network (PSTN).

4. The method of claim 1, wherein receiving the emergency call comprises receiving the emergency call and the routing device identifier together.

5. The method of claim 1, further comprising:
   determining, by a server associated with the data network, a physical location of the routing device from the routing device identifier.

6. The method of claim 5, further comprising:
   communicating, from a memory storage device to the server, routing device identifier information that corresponds to physical location information stored in a database of the memory storage device.

7. The method of claim 5, further comprising:
   communicating, from a memory storage device to the server, PSAP information that corresponds to physical location information stored in a database of the memory storage device.

8. The method of claim 1, further comprising:
   querying the routing device for the routing device identifier using a server associated with the data network; and
   responding to the query by providing the routing device identifier from the routing device to the server.

9. A network device for interfacing internet protocol (IP)-enabled emergency calls to a public 9-1-1 system comprising:
   a routing device to:
      store location information associated with the network device;
      receive data including an emergency call from an internet protocol (IP) telephony user device via a first data network;
      attach the location information and profile information to the emergency call, where the profile information identifies, based on the received data, the emergency call as originating from a fixed location associated with the IP telephony user device or a location remote from the fixed location; and
      route the emergency call along with the profile information and the location information to a second data network.

10. The network device of claim 9, wherein the first data network is a local area network (LAN).

11. The network device of claim 9, wherein the routing device comprises an edge router associated with the LAN.

12. The network device of claim 9, wherein the IP telephony user device comprises a voice over internet protocol (VoIP) telephony device.

13. The network device of claim 9, wherein the routing device further comprises a storage medium to store the location information.

14. The network device of claim 13, wherein the routing device further comprises a processing unit to respond to a query from the second data network, and provide the location information from the storage medium in response to the query.

15. A method for interfacing internet protocol (IP)-enabled emergency calls to a public 9-1-1 system comprising:
   receiving a 9-1-1 call on a data network placed from an internet protocol (IP) user device configured to be selectively used from a fixed location connection and from a plurality of remote location connections, wherein the 9-1-1 call includes profile information;
   determining, from the profile information, whether the 9-1-1 call originated from the fixed location or one of the remote location connections;
   determining, when the 9-1-1 call originated from the fixed location, whether at least one of an automatic number identification (ANI) or automatic location information (ANI) is resolvable from the profile information;
   identifying, when the emergency cal originated from the one remote location connection or neither the ANI nor the ALI is resolvable, an end-user routing device used to route the 9-1-1 call;
   designating an assigned public safety answering point (PSAP) based on the identified end-user routing device or the at least one of the ANI or the ALI;
   redirecting the 9-1-1 call to a public switched telephone network (PSTN); and
   forwarding the redirected 9-1-1 call to the assigned PSAP.

16. The method of claim 15, further comprising:
   populating a database with a geographic position of the end-user routing device.

17. The method of claim 16, further comprising:
   populating the database with the assigned PSAP corresponding to the geographic position.

18. The method of claim 15, further comprising:
   entering geographic position information in a memory of the end-user routing device.

19. The method of claim 18, wherein the geographic position information is included in a header of the dialed 9-1-1 call.

20. The method of claim 15, wherein identifying the end-user routing device comprises:
   transmitting a query from a server on the data network to the end-user routing device; and
   transmitting a response to the query from the end-user routing device to the server.

21. A system for interfacing internet protocol (IP)-enabled emergency calls to a public 9-1-1 system, comprising:
   means for registering in a database, a fixed geographic location of a customer premise routing device;
   means for designating a public safety answering point (PSAP) in a 9-1-1 system for the customer premise routing device;
   means for receiving an emergency call routed through the customer premise routing device;
   means for determining whether the emergency call originated from a first location;

means for determining, when the emergency call originated from the first location, whether at least one of am automatic number identification (ANI) or automatic location information (ANI) is resolvable for the emergency call;

means for determining, when the emergency call did not originate from the first location or neither the ANI nor the ALI is resolvable, that the customer premise routing device routes the received emergency call and retrieving the fixed geographic location from the database; and means for transmitting the received emergency call to the designated PSAP based on the fixed geographic location or the at least one of the ANI or the ALI.

* * * * *